G. F. BROWNING.
ELECTRIC SOLDERING IRON.
APPLICATION FILED FEB. 12, 1915. RENEWED MAR. 2, 1917.

1,237,290.   Patented Aug. 21, 1917.

Witnesses
Frank Hough
U. B. Hillyard.

Inventor
G. F. Browning
By Victor J. Evans
Attorney

UNITED STATES PATENT OFFICE.

GEORGE FRANCIS BROWNING, OF TOPPENICH, WASHINGTON.

ELECTRIC SOLDERING-IRON.

1,237,290.     Specification of Letters Patent.     Patented Aug. 21, 1917.

Application filed February 12, 1915, Serial No. 7,799. Renewed March 2, 1917. Serial No. 152,155.

*To all whom it may concern:*

Be it known that I, GEORGE FRANCIS BROWNING, a citizen of the United States, residing at Toppenich, in the county of Yakima and State of Washington, have invented new and useful Improvements in Electric Soldering-Irons, of which the following is a specification.

The invention provides a soldering iron for use in places where an electric current is available, the purpose being to provide a device of the character stated which may be used continuously without requiring periods of heating such as is common with the usual soldering copper which is placed in a fire or over a flame for such purpose.

The invention provides a soldering device which may be electrically heated and which is of such construction as to enable replacements being readily made as occasion may require, the soldering device embodying a chamber in which a quantity of solder is contained in a molten state ready for instant use.

The invention consists of the novel features, details of construction and combination of parts, which hereinafter will be more particularly set forth, illustrated and claimed.

In the drawings hereto attached:—

Corresponding and like parts are referred to in the following description, and indicated in all the views of the drawing, by the same reference characters.

Figure 1:
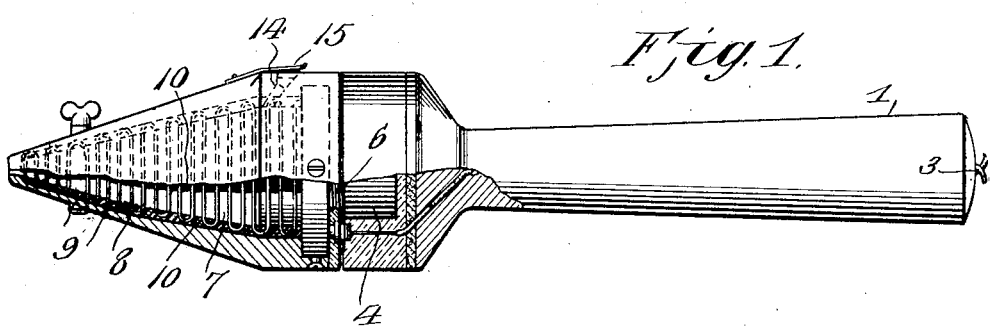
Figure 1 is a side view of a soldering device of the character hereinbefore stated embodying the invention.
Figure 2:
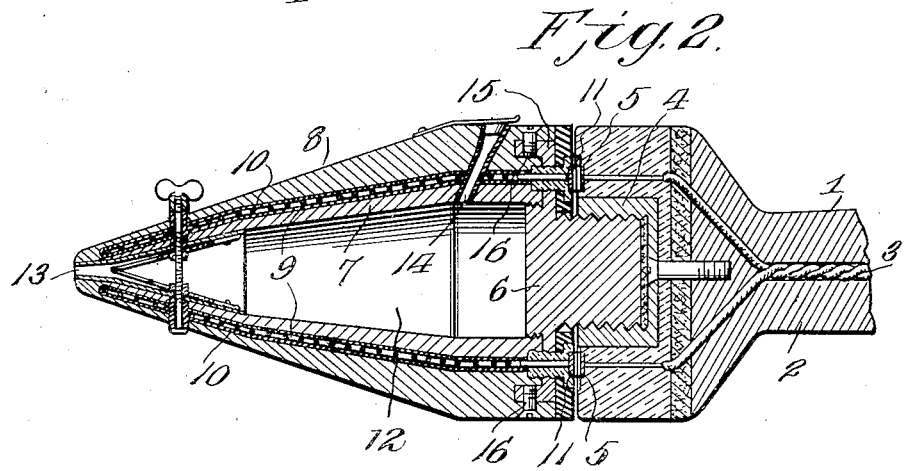
Fig. 2 is an enlarged section of the tip and a part of the handle.
Figure 3:
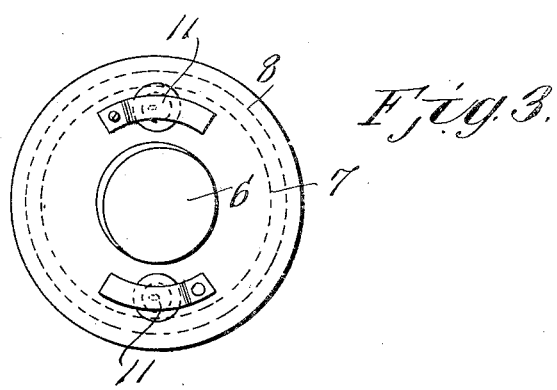
Fig. 3 is an end view of the tip as seen from the coupling extremity.

The soldering device comprises a tip and a handle, the two being detachably connected preferably by means of a screw thread joint. The handle 1 may be of any length or material and is formed with a longitudinal opening 2 through which the electric conductor 3 passes. An internally threaded socket 4 is provided at the coupling end of the handle and such socket receives the ends 5 of the electric conductors. The electric conductor 3 is adapted to be connected by means of a plug with the usual socket of an electric fixture or other outlet commonly provided for making connection of electric devices with a source of electric supply. The tip of the soldering device is provided at one end with a threaded shank 6 which is adapted to make connection with the socket 4. The tip is of the usual tapered form and comprises an inner shell 7 and an outer shell 8, both shells being of tapering form and inclosing the heating coil 9 between them, said coil being electrically insulated from the shells by means of mica 10 or other insulating material. The terminals of the heating coil 9 are electrically connected with contacts 11 which when the tip is properly connected to the handle are in electric connection with the terminals 5 of the electric conductor. The shells 7 and 8 are of metal, the shell 7 being preferably of steel and the shell 8 of copper. The space 12 inclosed by the shell 7 constitutes a chamber for receiving a quantity of solder which is retained therein in a molten state when the soldering device is in condition for use. An axial opening 13 is formed at the point of the soldering tip and communicates with the chamber 12 and serves as an outlet for the solder which flows therethrough to the part to be soldered. The outlet 13 may be closed in any manner when the soldering device is heating or is temporarily laid aside. An opening 14 extends through the base portion of the tip and communicates with the chamber 12 and provides means for supplying solder to the chamber 12 to replace that used. A plate 15 is adapted to be secured to the base portion of the shell 8 and is retained in place by means of screws 16. When the plate 15 is removed the parts comprising the tip may be separated, thereby facilitating replacement thereof as the same becomes necessary.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the invention as claimed.

Having thus described the invention, what is claimed as new is:—

1. A soldering device of the character specified comprising a handle and a tip, the tip containing an electric heating coil and the handle being provided with an electric conductor, the heating coil and electric conductor making electric connection when the tip is properly fitted to the handle, a plate, and diametrically opposed means for connecting the plate with the tip for fastening the latter to said handle.

2. A soldering device of the character specified comprising a handle, a tip comprising concentric inner and outer shells of tapering form and an intermediate electric heating coil arranged between the two shells and electrically insulated therefrom, the inner shell containing a chamber for receiving a quantity of solder, such chamber having an outlet at the point and a replenishing opening near the base, a plate, and means for securing the plate to the base portion of the outer shell for detachably connecting the tip with said handle.

In testimony whereof I affix my signature in presence of two witnesses.

GEORGE FRANCIS BROWNING.

Witnesses:
 FRANK M. HATTON,
 RALPH B. WILLIAMSON.